United States Patent [19]
Jensen et al.

[11] 3,900,871
[45] Aug. 19, 1975

[54] CONTIGUOUS FILTER TRACKING WINDOW FOR RADAR

[75] Inventors: Garold K. Jensen, Alexandria, Va.;
James E. McGeogh, Silver Spring, Md.

[73] Assignee: The United States of America as represented by the Secretary of the Navy, Washington, D.C.

[22] Filed: June 11, 1971

[21] Appl. No.: 154,237

[52] U.S. Cl. ............................................... 343/8
[51] Int. Cl.² .......................................... G01S 9/44
[58] Field of Search ........................... 343/7.7, 8, 9

[56] References Cited
UNITED STATES PATENTS

| | | | |
|---|---|---|---|
| 3,742,499 | 6/1973 | Beydler | 343/7.7 |
| 3,787,850 | 1/1974 | Sletten et al. | 343/7.7 |
| 3,855,595 | 12/1974 | Jensen et al. | 343/8 |

*Primary Examiner*—T. H. Tubbesing
*Attorney, Agent, or Firm*—R. S. Sciascia; Arthur L. Branning

[57] ABSTRACT

A contiguous filter for use with a HF, phase-coherent, storage-type, pulse-doppler radar which employs a spectral compression technique for processing velocity and acceleration signals. A number of parallel channels, each covering a contiguous section of the multiplied doppler frequency band to be covered, are used. Each channel comprises a bandpass filter, an amplifier, a limiter, another bandpass filter and a gate. The gates are sequentially opened to pass a sweeping signal that the signal analyzer, to which the output of the gates is fed, is matching.

2 Claims, 9 Drawing Figures

INVENTORS
GAROLD K. JENSEN
JAMES E. McGEOGH

*Philip Schneider*
*Arthur L. Fleming* ATTORNEYS

INVENTORS
GAROLD K. JENSEN
JAMES E. McGEOGH
ATTORNEYS

CONTIGUOUS FILTER TRACKING WINDOW FOR RADAR

BACKGROUND OF THE INVENTION

This invention relates to a gating system for serially gating the outputs of a set of frequency channel filters which divide a band of doppler frequencies into narrower contiguous bands.

A problem that besets a velocity-analyzing radar that utilizes coherent integration over a multisecond storage time and provides good doppler resolution occurs as a result of target acceleration with respect to the radar site. (This type of radar is of the type described in copending U.S. pat. application Ser. No. 649,791 for a "Storage Radar System," filed by Garold K. Jensen on June 27, 1967.) In the accelerating target case, the return signal, stored for the integration period, has its energy distributed over a range of doppler frequencies, with a consequential reduction in signal energy at any single frequency or any fractional frequency band. A degradation of minimum detectable signal and of doppler resolution is thereby produced. Attempts to minimize the acceleration effects normally result in a reduction of doppler resolution and the ability to detect low-level signals.

Spectral compression of the acceleration-spread doppler frequency spectrum can be employed in radar systems to provide a system capable of detecting returns from accelerating targets, as well as constant-velocity targets, without loss of velocity resolution or signalto-noise ratio (accrued from multisecond coherent integration) and also capable of adding the acceleration of the target as a system parameter. However, the same frequency modulation that is employed to compress the spread spectrum of the return signal from an accelerating target can produce frequency spreading of the signal energy from a constant-velocity target in the same manner that the signal return from an accelerating target is spectrally spread in the absence of spectral compression techniques. In either case, a large-amplitude signal return will be detected and displayed (spread) over a wide band of doppler frequencies, with nearly equal amplitudes, so that an accurate doppler or velocity reading is not possible. Also, other signals of interest may be of less amplitude and occur within the region of dopplerspreading of the larger signal. These signals will then be masked by the larger spread signal.

Since the energy at any frequency in the spread spectrum is proportional to the total signal energy, and approximately inversely proportional to the frequency-spreading (beyond a velocity resolution bandwidth), it follows that if the total signal amplitude is limited, a limit is likewise imposed upon the bandwidth over which the signal may be spread and yet still exceed the detectable level. This principle is used to eliminate the undesired spreading, at the display, of large amplitude, unmatched signals and is instrumented by means of a set of contiguous filters and associated limiters located between the signal store and the velocity-and-acceleration analyzer. In the application of the contiguous filter to the Acceleration Gate System, low-level signals from accelerating targets may be spectrally compressed and detected without loss of the signal-to-noise ratio obtained with integration. Largeor small-amplitude signals or interference which do not match an acceleration profile or modulation function may be eliminated from the display.

The contiguous filter provides the second feature of separating the doppler frequency span into a number of frequency bands before limiting. Without this separation into frequency bands, a very large signal could "capture" small signals, existing anywhere in the whole doppler band, by the limiting process. But in the contiguous filter the capture effect occurs, within a 60-db system limit, in no more than one channel (only one-tenth of the doppler band of a ten-channel filter is used) even for a cw interfering signal. In that single channel the largeamplitude signal will be reduced to the limiting level, and undesirable display effects will be eliminated. Signals in the remaining nine-tenths of the doppler band will be unaffected and may be processed normally.

Each contiguous filter employs a bandpass filter and, when bandpass filters are required to accept input signals with high-frequency sweep rate, the nonlinear phase characteristic and non-constant amplitude response at the band edges causes undesirable transient effects.

SUMMARY OF THE INVENTION

These undesirable transient effects can be minimized or eliminated by placing a gate at the end of each filter channel. The gates are sequentially opened with no overlap or gaps in time to pass a frequency-sweeping signal that the velocity-or-acceleration signal analyzer is anticipating or matching. The bandpass filters which are part of each filter channel can be made to cover a bandwidth somewhat larger than the channel bandwidth and each gate is open only over the smaller part of the filter bandwidth in which it has a linear frequency characteristic. Thus, operation over the ends of the filter frequency characteristic, where the undesirable transient effects are caused, is avoided.

An object of this invention is to minimize the undesirable transient effects caused by the nonlinear frequency-phase characteristic and non-constant amplitude response at the band edges of bandpass filters which are passing input signals with high-frequency sweep rates.

Another object is to limit the amplitude of large interfering signals so that they do not "capture" the entire doppler band.

A third object is to prevent large-amplitude spectrally spread signals from masking lower-amplitude spectrally compressed signals.

Other objects, advantages and novel features of the invention will become apparent from the following detailed description of the invention when considered in conjunction with the accompanying drawings wherein:

DETAILED DESCRIPTION OF THE INVENTION

Figure 1:
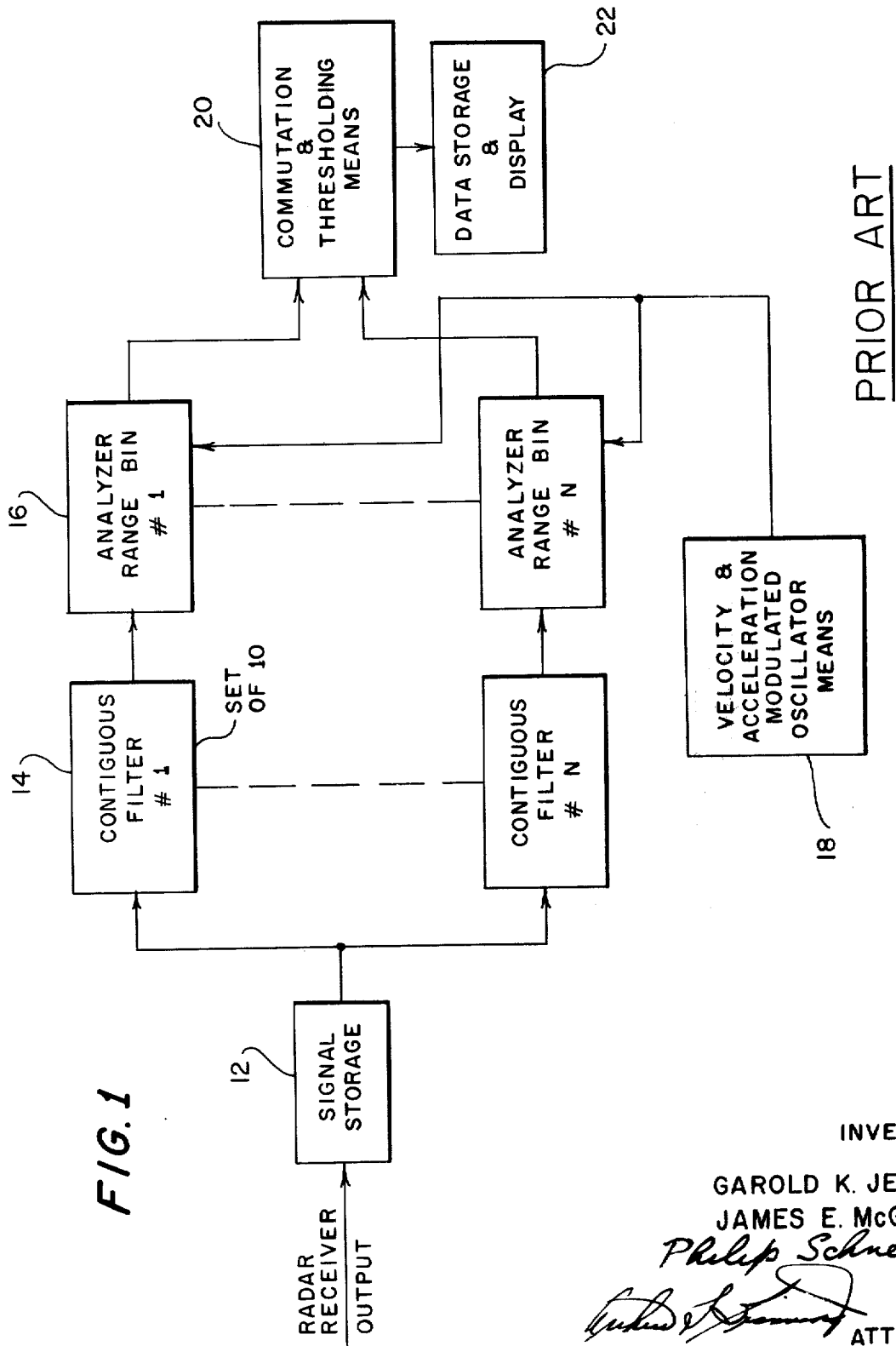
FIG. 1 is a block diagram showing the location of the contiguous filters within a velocity-andacceleration analyzing radar of the type described in the previously cited U.S. Pat. application Ser. No. 649,791.

As shown in FiG. 1, which illustrates a part of an O-T-H radar as described in copending patent application Ser. No. 649,791, the output of the radar receiver is fed to the signal storage circuit 12. The output of the signal storage circuit 12 is fed to the contiguous filters. (Since the circuit is broken into identical channels, only one channel will be described.) The output of each contiguous filter 14 is fed to a velocity-and-acceleration analyzer range bin 16. Each range bin 16 includes a mixer, a predetection filter, an IF amplifier, a post detection filter and a video output stage. All range bins are swept in frequency by the output signal of the velocityand-acceleration-modulated oscillator means 18.

The velocity-modulated signal (see FIG. 3) is a signal which is of constant frequency for an interval of time and then is stepped to a higher frequency for another interval, and so on. The acceleration-modulated signal is a series of sawtooth signals by which the frequency bandwidth is swept in a series of steps, each of increasing slope or rate.

The output of the range bin 16 is then fed to a commutation-and-thresholding means 20 and thence to the data storage and display means 22.

This type of circuit separates the returns by range and also divides the doppler frequency band of the reflected radar signals into separate bands, searching each band for reflected signals, attempting to match velocities and accelerations. The problem is that when each filter is swept near the edge of its bandwidth, undesirable transient effects arise from nonlinearity in the phase vs. frequency characteristic and from nonconstant amplitude response. This can be eliminated by making each filter bandwidth larger and gating the filter in time so that an output from the swept signals is obtained only over the linear part of the phase-frequency characteristic.

Figure 2:
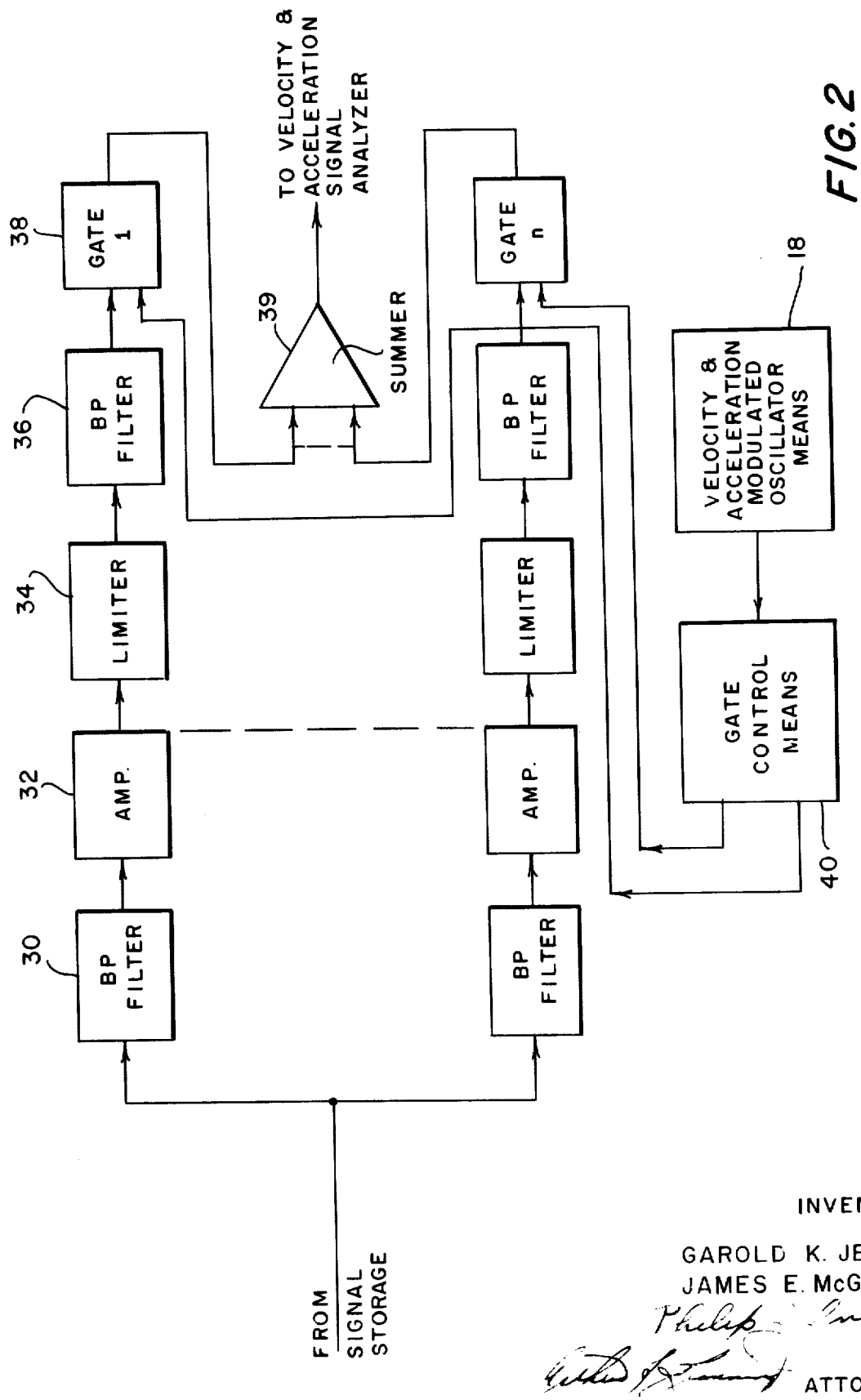
FIG. 2 is a block diagram of the contiguous filter system in accordance with the present invention.

As shown in FIG. 2, which is an embodiment of the invention, each contiguous filter consists of a set of individual channel filters comprising a first bandpass filter 30, an amplifier 32, a hard limiter 34, a second bandpass filter 36, and a gate 38, which are connected to a summer circuit 39. All the gates 38 are sequentially opened by gate control means 40, so that the bandpass filters can be swept by the velocity-andacceleration modulated signal output of the velocity-and-acceleration modulated oscillator means 18. The amplifier and limiting means may not be necessary in any particular application but they are used in general.

The bandpass filters (BPF's) are all of equal bandwidths, with their passbands positioned immediately adjacent to each other in frequency, and designed so that the total passband equals the entire input signal bandwidth. This bandwidth is determined by the product of the unambiguous doppler extent and the processing timecompression-ratio of the signal storage system. The minimum detectable doppler frequency is limited to the cutoff frequency of the backscatter rejection filter (not shown) and the maximum unambiguous doppler frequency is limited to one-half of the pulse repetition frequency. In a typical radar, if ten channels are used, the bandwidth of each channel might be about 0.7 Mc/s.

Figure 3:
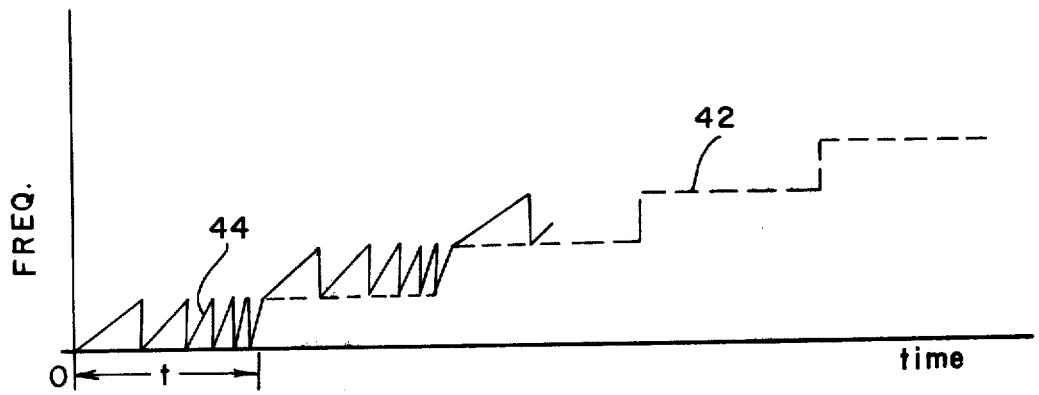
FIG. 3 is a diagram illustrating the velocityand-acceleration modulated sweep signal.

FIG. 3 is a representation of the velocity-and-acceleration modulated signal used for sweeping the bandpass channels. Velocity is swept in a series of constant-frequency steps 42, each of which lasts for an equal interval of time, $t$. Acceleration is swept by a series of frequency versus time sawtooth waves 44 in each time interval, the waves 44 being of increasing slope.

Figure 4:
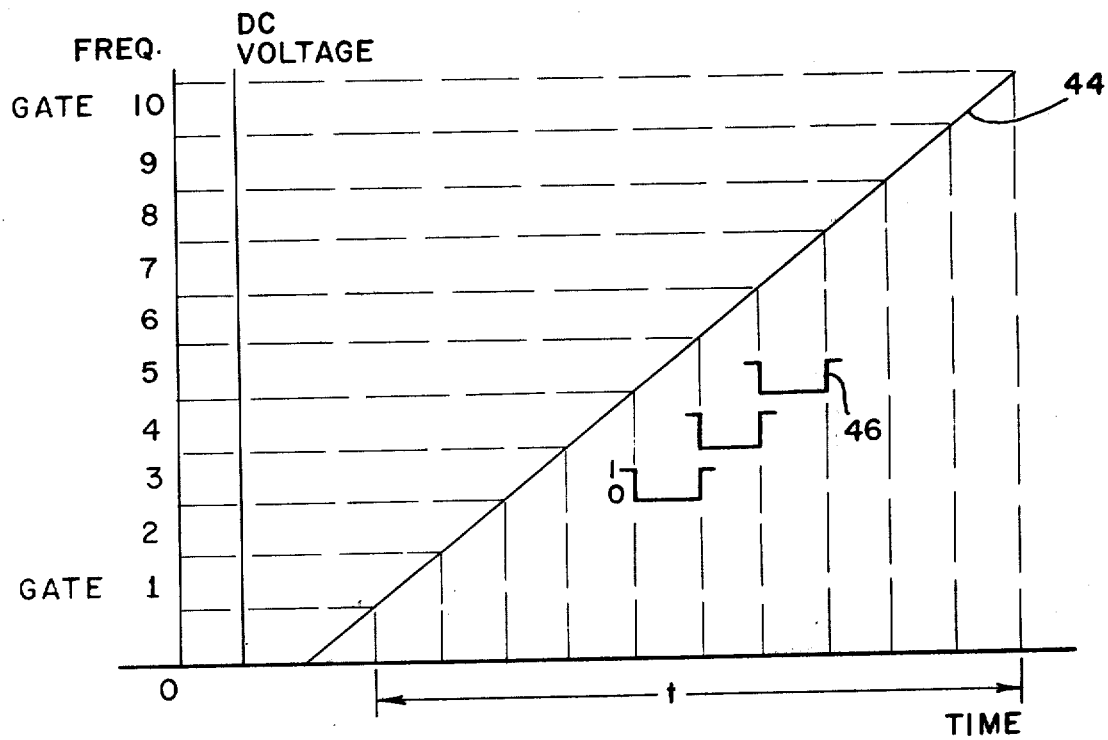
FIG. 4 is a diagram illustrating time and voltage relations for production of enabling pulses for the various gates.

FIG. 4 is a diagram which is of value in explaining the operation of the gate control means 40. Let line 44 be one of the acceleration-matching frequency sweeps. Each one of the ten gates 38 in the filter circuits must be opened while the sweep signal matches its band of frequencies. Thus a gating pulse 46 must be timed to occur for the proper interval as shown and must be applied to the proper gate.

The timing is accomplished by means of d.c. voltage levels. Thus, gate 5 would be switched open when the voltage level of the sweep line reached level $p$ and would be switched closed when the level reached $q$, at which time gate 6 would be opened. The d.c. voltage levels are obtained by passing the velocity-and-acceleration modulated signal through a frequency discriminator (included in the velocity-and-acceleration modulated oscillator means 18) which provides a d.c. output signal proportional to the frequency of its input signal.

Figure 5:
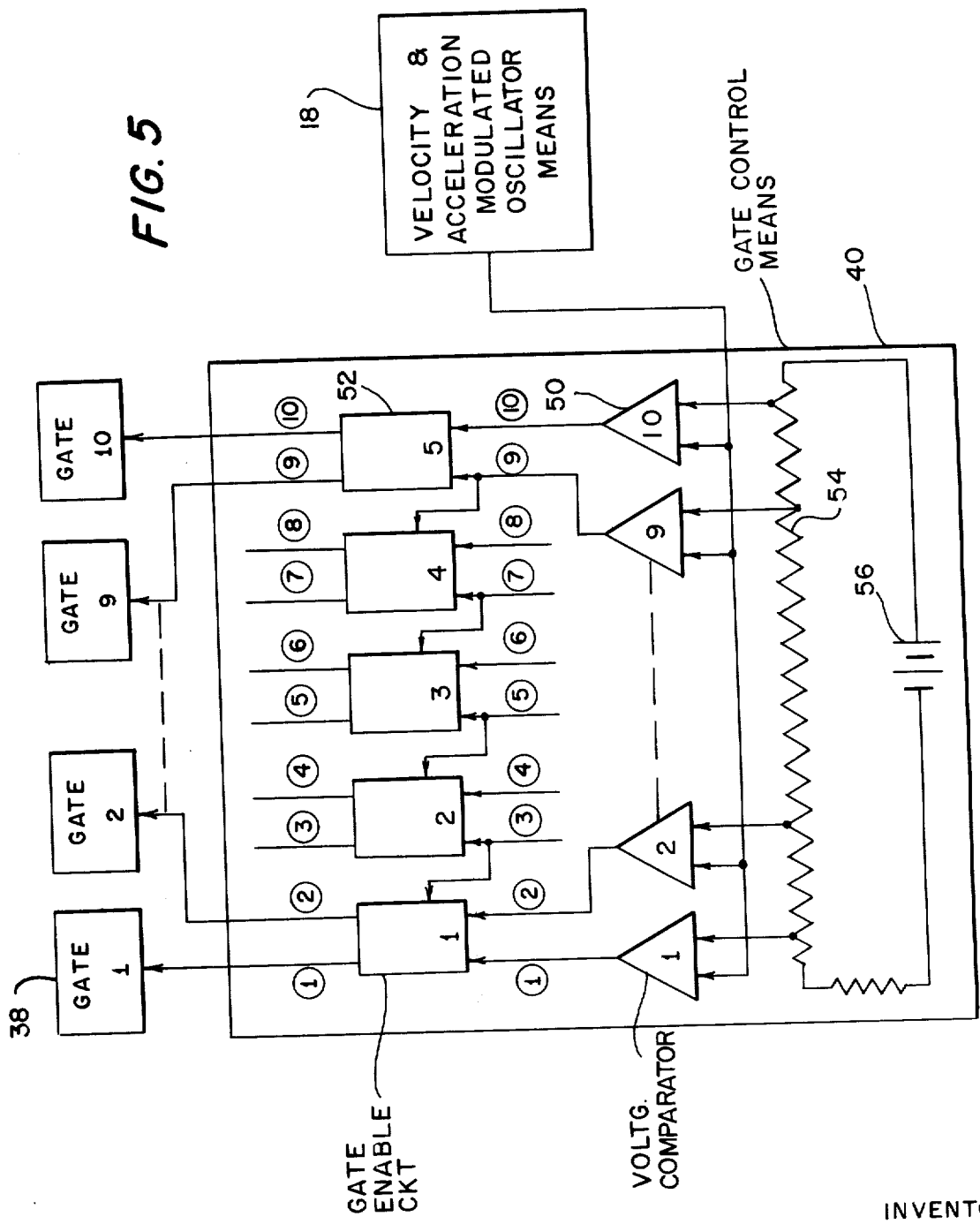
FIG. 5 is a block diagram of a portion of the circuit of FIG. 2, showing the coupling between units.
Figure 6:
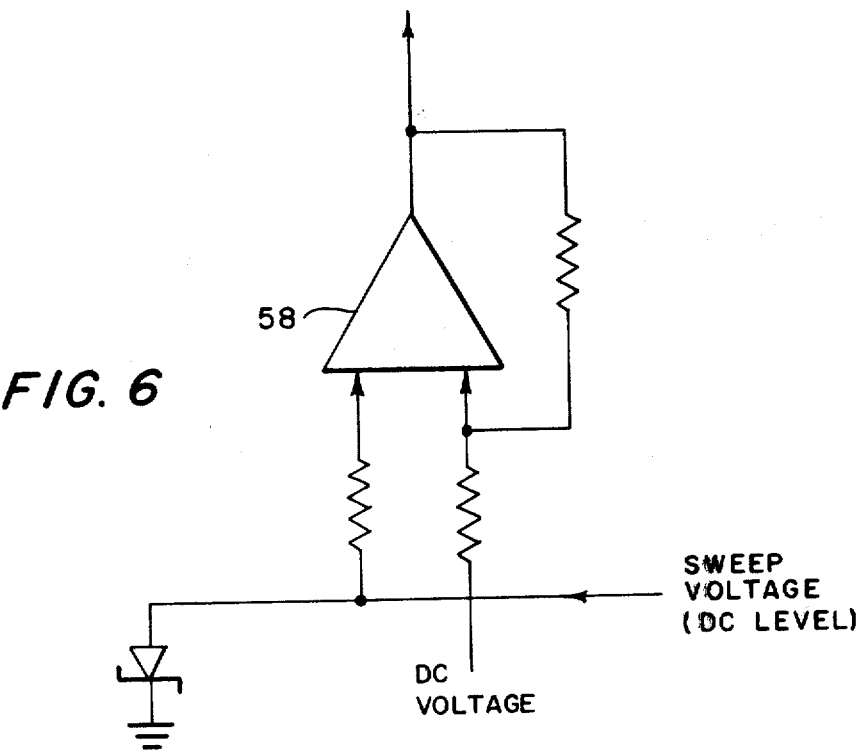
FIG. 6 is a schematic diagram of a circuit which can be used as a comparator.

FIG. 5 illustrates the block diagram for the gate control means 40. A plurality of voltage comparators 50 are connected across a tapped resistor 54 which is connected across a d.c. voltage source 56. Thus, different d.c. voltage levels in increasing steps are connected to one input of each of the comparators 50. The other input terminal of each comparator 50 is connected to receive the output of the velocity-and-acceleration-modulated oscillator means 18 (actually the d.c. output of the frequency discriminator previously mentioned). When the sweep voltage from the oscillator 18 reaches the d.c. voltage level of each comparator, the output state of that particular comparator is changed (i.e., from a 1 to a 0, or vice versa). A circuit which may be utilized for the comparator 50 is shown in FIG. 6 and utilizes an operational amplifier 58.

Figures 7, 8:
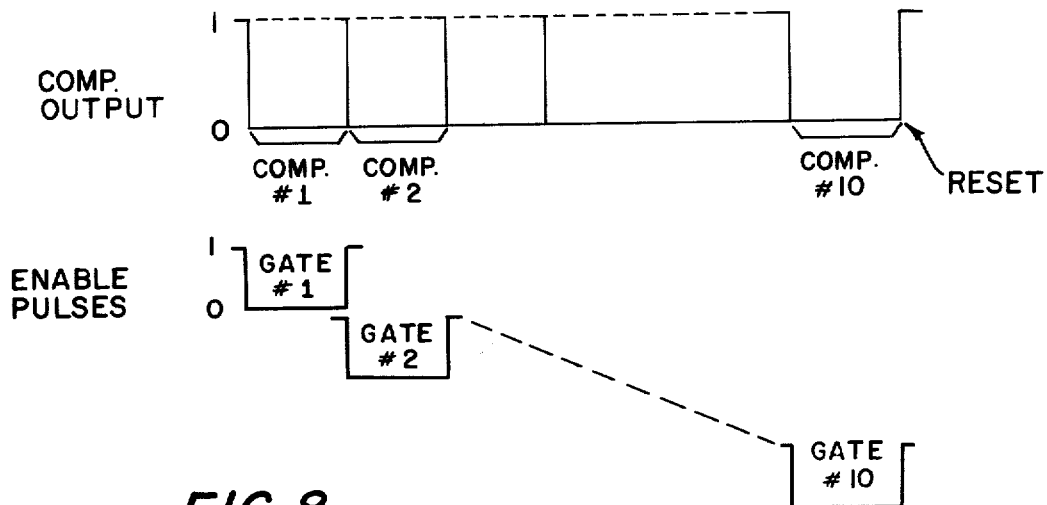
FIG. 7 is a truth table for the gate enable circuits.
FIG. 8 is an illustration of the comparator and gate enable circuit outputs.

The comparators are arranged so that the normal output is a 1 and when the comparator is changed, the output is a 0, the zero level being more negative than the 1 level as shown in FIG. 8. Thus, when the level of its d.c. bias input is reached by the d.c. output signal from the frequency discriminator in the oscillator means 18, the output level of comparator No. 1 goes from the 1 condition to the 0 condition and stays there until the discriminator output level goes back to zero at the end of a sweeping cycle. All comparators are then reset to the 1 output condition.

The gate enable-pulse circuits 52 are conventional pulse-producing circuits such as the RCA CD 22010 logic gate. The logic table indicating the output states on each numbered lead-in response to the input states on the numbered leads is shown in FIG. 7.

Considering the output table for gate enable circuit 1, the original states for inputs 1 and 2 are a 1 condition. When the d.c. level on input 1 rises high enough, comparator 1 is tripped and input 1 to the gate enable circuit 1 goes to 0 condition. This gives a 0 output which goes to gate 1 and switches it on. Next, comparator 2 trips and its output becomes a 0. Gate enable circuit 1 now has a 0 condition on inputs 1 and 2 and its output goes back to the 1 condition which turns off gate 1.

Gate enable circuit 1 now has a 0 condition on input 2 and a 1 on input 3 giving it a 0 output level for output 2 which turns on gate 2. This continues until input 3 goes to a 0 condition when comparator 3 is tripped. Inputs 2 and 3 are now at 0 level and output 2 of enable circuit 1 goes to a 1 level which turns off gate 2. The operation of the gate enable circuits and the gates after this point can be followed from the truth table.

Figure 9:
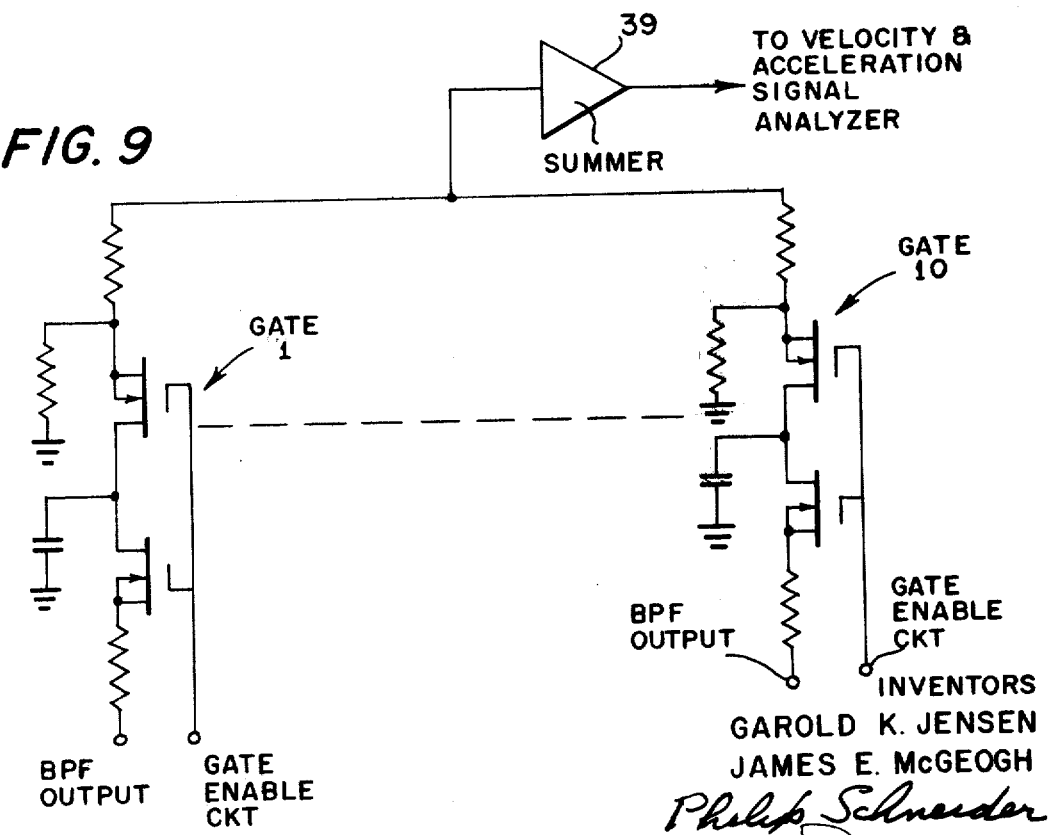
FIG. 9 is a schematic diagram of the gate and summer circuits showing a particular type of circuit which may be used as a gate.

FIG. 9 illustrates a circuit which can be employed as a gate 38. The circuit is conventional, operating on two field-effect transistors. The gate enable circuit is applied to the gate electrodes and the bandpass filter output is applied to the source electrode of the lower FET. Both FET's are turned on by the same enabling pulse and the output of all gates is applied to the summer circuit 39 having a low output impedance.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A contiguous filter covering a given bandwidth of doppler frequencies and separated into a set of $n$ contiguous channels which divide the total bandwidth into narrower bandwidths equal to the doppler bandwidth divided by $n$, each channel comprising, in combination:

bandpass filter means having a bandwidth larger than the doppler frequency divided by $n$;

gating means connected to receive the output of said bandpass filter;

gate control means connected to said gating means for producing enabling signals for opening said gating means to permit signals to be passed therethrough; and velocity-and-acceleration modulated oscillator means connected to said gate control means for controlling the production of said enabling signals so that the gating means in said set of contiguous channels are opened and closed serially with no time overlap, each gating means being opened only for the time taken by the velocity-and-acceleration modulated signal to completely sweep the dopplerbandwidth-divided-by-n bandwidth of that particular gating means' associated filter.

2. A contiguous filter as set forth in claim 1, wherein: said bandpass filter means comprises a first and second bandpass filter and further including limiting means connected between said bandpass filters.

* * * * *